United States Patent
Szczepanski et al.

(10) Patent No.: US 7,794,153 B2
(45) Date of Patent: Sep. 14, 2010

(54) ADJUSTING AND MAINTAINING BEARING PRELOAD IN AN AXLE ASSEMBLY

(75) Inventors: Gerald S. Szczepanski, Dearborn, MI (US); Charles Krysztof, Canton, MI (US); Jeffrey L. Hoff, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 517 days.

(21) Appl. No.: 11/952,456

(22) Filed: Dec. 7, 2007

(65) Prior Publication Data
US 2009/0145683 A1 Jun. 11, 2009

(51) Int. Cl.
*F16C 35/06* (2006.01)

(52) U.S. Cl. .................. 384/583; 384/519; 384/540; 384/562

(58) Field of Classification Search ......... 384/519, 384/562, 563, 571, 583, 584, 585; 475/230
See application file for complete search history.

(56) References Cited

U.S. PATENT DOCUMENTS

| | | | |
|---|---|---|---|
| 1,631,557 A * | 6/1927 | Sponable | 384/583 |
| 1,774,160 A | 8/1930 | Sweet | |
| 2,546,969 A * | 4/1951 | Buckendale | 475/246 |
| 3,260,132 A * | 7/1966 | West et al. | 475/246 |
| 3,826,151 A | 7/1974 | F'Geppert | |
| 3,872,741 A | 3/1975 | Berchtold et al. | |
| 5,269,731 A | 12/1993 | Scudder et al. | |
| 6,357,927 B1 | 3/2002 | Myers et al. | |
| 6,478,709 B1 | 11/2002 | Irwin et al. | |
| 6,533,697 B2 | 3/2003 | Morse et al. | |
| 6,685,359 B2 | 2/2004 | Wickens | |
| 6,884,196 B1 | 4/2005 | Ziech | |
| 7,090,609 B2 | 8/2006 | Ziech et al. | |
| 7,108,428 B2 | 9/2006 | Ason et al. | |
| 7,175,560 B2 | 2/2007 | Petruska et al. | |
| 2007/0111841 A1 | 5/2007 | Smith | |
| 2007/0155578 A1 | 7/2007 | Petruska et al. | |

* cited by examiner

*Primary Examiner*—Thomas R Hannon
(74) *Attorney, Agent, or Firm*—David B. Kelley; MacMillan, Sobanski & Todd, LLC

(57) ABSTRACT

An axle differential mechanism includes a carrier, a bearing supporting the carrier in rotation about an axis, a bearing adjuster including a adjuster sleeve held against rotation and axial displacement, and an adjuster nut formed with first teeth, and engaged by screw threads with the adjuster sleeve such that rotation of the adjuster nut about the axis causes the adjuster nut to contact the bearing and produce a preload force on the bearing between the adjuster nut and the carrier, and a locking device secured against displacement for engaging the adjuster nut, said engagement preventing rotation of the adjuster nut relative to the bearing and maintaining the preload on the bearing.

17 Claims, 6 Drawing Sheets

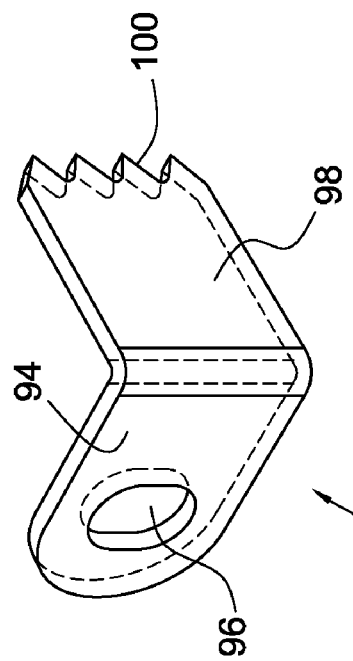
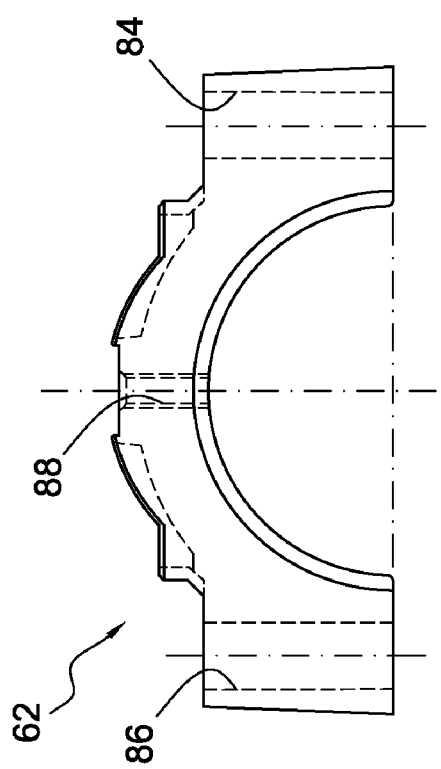

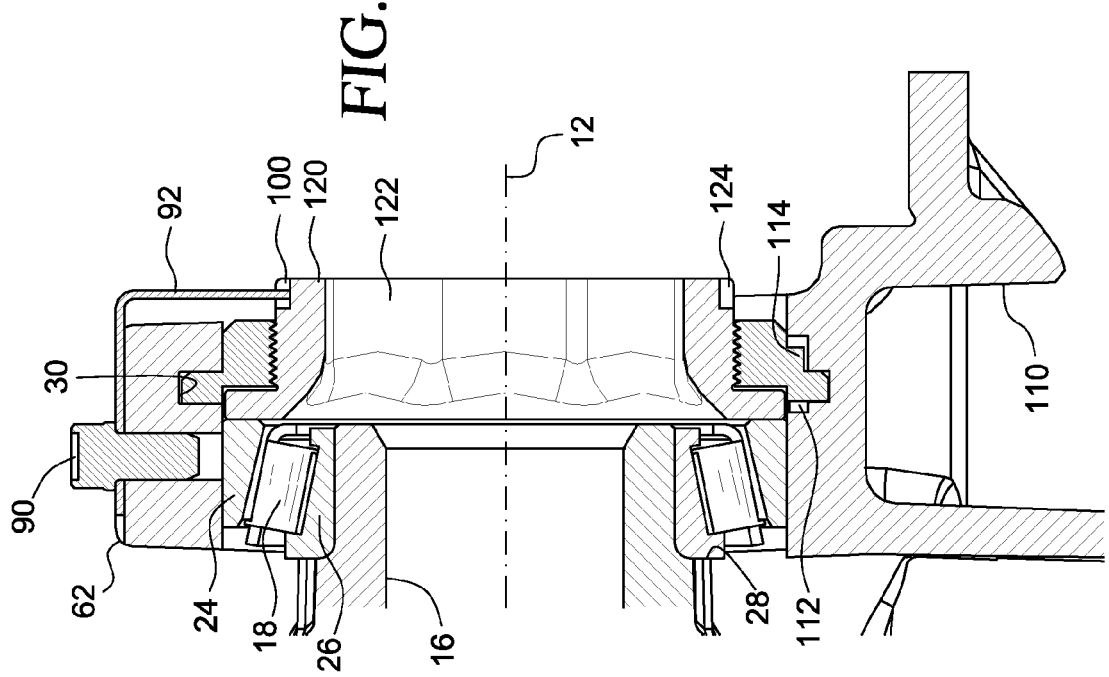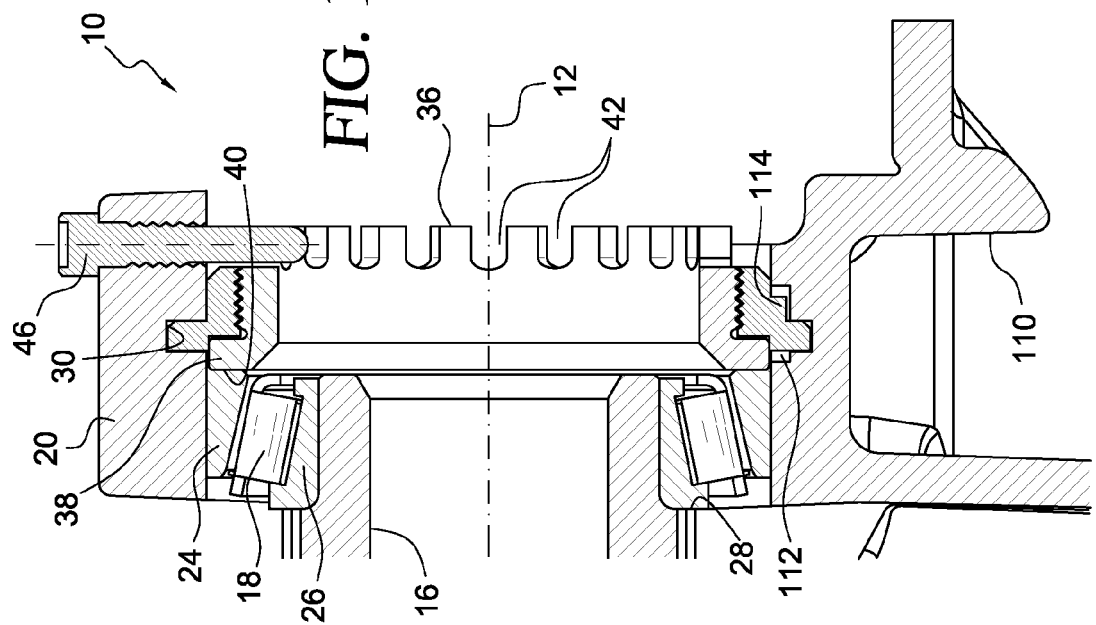

ADJUSTING AND MAINTAINING BEARING PRELOAD IN AN AXLE ASSEMBLY

BACKGROUND OF THE INVENTION

1. Field of the Invention

This invention relates generally to a differential mechanism and, in particular, to an adjuster for locating a carrier relative to a housing, and for producing and maintaining preload on bearings in the differential mechanism.

2. Description of the Prior Art

The bearings that support a differential carrier in an axle differential are commonly preloaded by shims, snap rings, or adjuster nuts.

These devices, which position the differential carrier and preload the bearings, affect bearing life, heat generation, operating efficiency and system stiffness. Of the three devices, use of adjuster nuts provides the easiest method for locating the differential carrier and setting the bearing preload at its initial installation and later while in service. In contrast to shims and snap rings, releasing the locking mechanism allows a simple rotation of the adjuster nut to correct preload and position issues.

Shims and snap rings involve spreading the housing, removing the old shim or snap ring, and installing new ones.

Despite the advantages of adjuster nuts, the usual method of forming the adjuster threads into a split bore created by a cap and housing creates manufacturing and assembly problems. Creating a large diameter, fine pitch thread in the housing and cap, or in the housing alone increases the opportunity for cross threading, cap misalignment, and related scrap issues.

SUMMARY OF THE INVENTION

An axle differential mechanism assembly includes a differential carrier, bearings supporting the carrier in rotation about an axis, a bearing adjuster or adjusters including an adjuster sleeve held against rotation and axial displacement, and an adjuster nut formed with first teeth and engaged by screw threads with the adjuster sleeve, such that rotation of the adjuster nut about the axis causes the adjuster nut to contact the bearing. That contact positions the differential carrier and produces a preload force on the bearings. A locking device is secured against displacement for engaging the adjuster nut. That engagement prevents rotation of the adjuster nut relative to the bearing and maintaining the preload on the bearings.

The adjuster threads are located internal to the sleeve and nut assembly, not in the housing and cap. Therefore, these threads can be a smaller diameter than if they were cut into a bearing cap and housing, permitting the use of more standard threading tools with minimum thread pitch and optimized for the required engagement length. Scrapping the adjuster due to thread defects is considerably less costly than scrapping an entire housing.

By eliminating threads in the housing and cap differential bore, the assembly requires less complex machining. A continuous bore can be machined to hold the outer sleeve body and the differential bearing race and a circumferential slot cut at the same time in the cap and housing provide a reaction surface for the outer sleeve flange.

The adjuster sleeve locks the adjuster into the housing. Axial motion is restricted by the circumferential slot or another defined seat surface. Anti-rotation features on the adjuster sleeve can use existing features on the housing or bearing cap to accomplish this task.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 9 is a side view of a bearing cap;

FIG. 10 is a perspective view of a lock tab;

FIG. 11 is a cross section taken at a diametric plane through a tapered thrust bearing in a differential mechanism showing a third embodiment;

FIG. 12 is a cross section taken at a diametric plane through a tapered thrust bearing in a differential mechanism and showing a fourth embodiment.

DESCRIPTION OF THE PREFERRED EMBODIMENT

Figure 1:
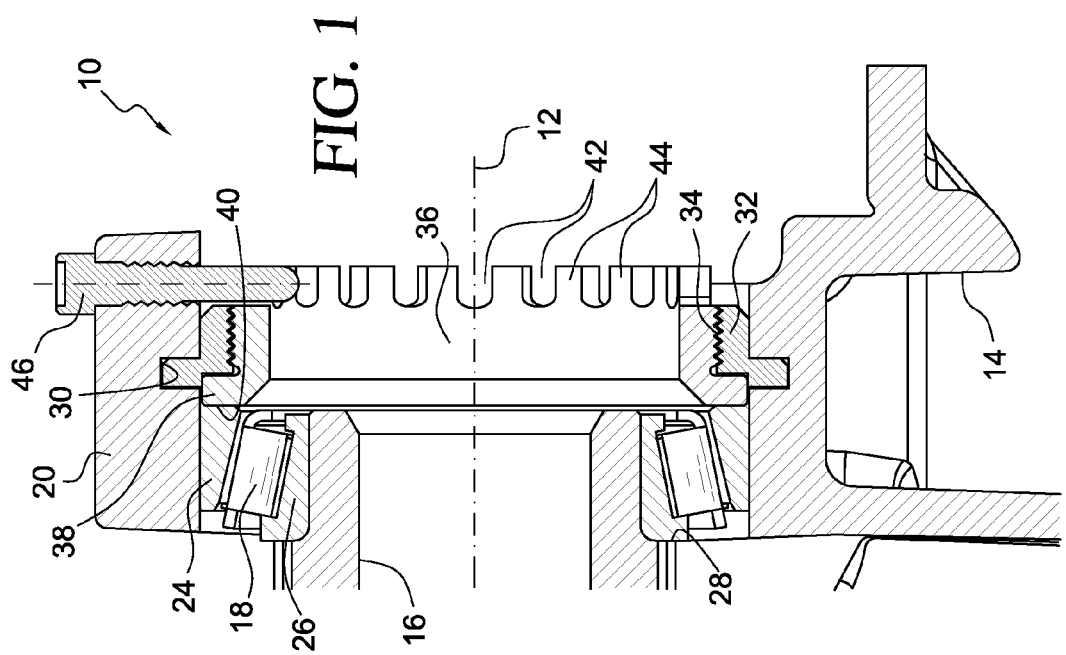
FIG. 1 is a cross section taken at a diametric plane through a tapered thrust bearing assembled in a differential mechanism.
Figure 2:
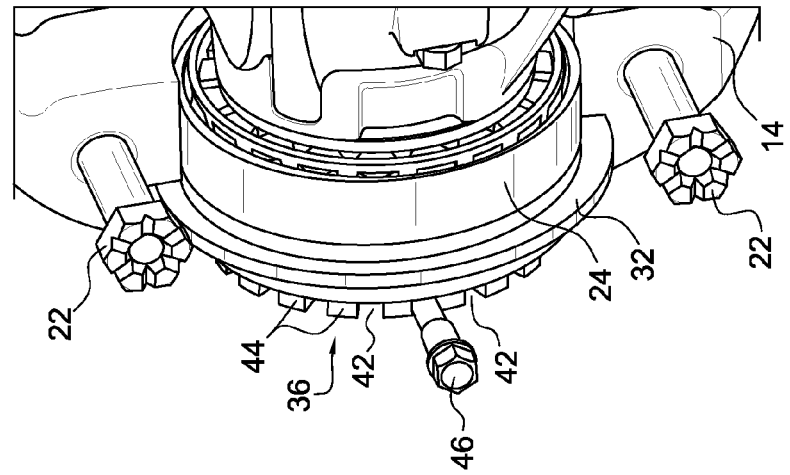
FIG. 2 is a perspective view of the assembly shown in FIG. 1 with the bearing cap removed.
Figure 3:
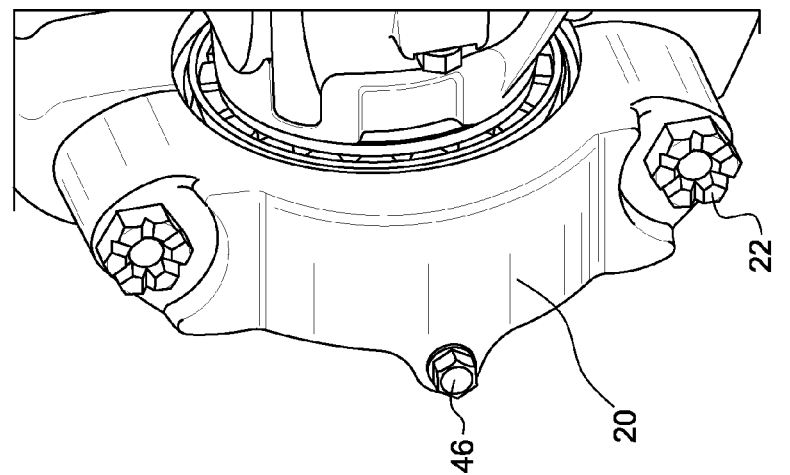
FIG. 3 is a perspective view of the assembly of FIG. 1 with the bearing cap installed.

Referring now to the drawings, there is illustrated in FIGS. 1-3 a differential mechanism 10 arranged concentrically about an axis 12 and installed in a housing 14, such as a differential housing. A differential carrier 16 is supported for rotation in the housing 14 by a bearing 18. A bearing cap 20, a semicircular arcuate component fitted over the bearing 18, is secured to housing 14 by bolts 22, which engage internal screw threads formed in the housing.

The bearing 18 includes an outer race 24, whose outer surface contacts an inner surface of the cap 20, an inner race 26, whose inner surface contacts the differential carrier 16 and is seated against a shoulder 28 formed on the differential carrier, and roller elements located radially between the inner and outer races 26, 24.

The inner surface of the bearing cap 20 and the inner surface of housing 14 are formed with an annular groove 30, which contains an adjuster sleeve 32, formed with internal screw threads 34. An adjuster nut 36 is formed with external screw threads that engage the threads on sleeve 32, and a flange 38 having a first axial surface 40 that contacts an axial end face of the outer bearing race 24.

The adjuster nut 36 is a castellated nut formed with a series of angularly spaced recesses 42 located between successive teeth 44. A threaded pin 46, engaged with screw threads formed in the bearing cap 20, extends radially toward axis 12 and into one of the recesses 42 on adjuster nut 36.

In operation, the bearing adjuster nut 36 is assembled such that it engages the threads on sleeve 32, and then the assembly and bearing 18 are installed in the housing. Bearing cap 20 is fitted over bearing 18, such that flange of sleeve 32 is located in the annular groove 30. The differential carrier is then positioned, and the torque on adjuster nut 36, applied to either internal or exterior features, is increased to a predetermined reference torque or housing spread, at which the preload on bearing 18 is established within a desired range. Finally, pin 46 is threaded into bearing cap 20 in a recess 42 and engaging the adjacent teeth 44, which engagement prevents rotation of adjuster nut relative to sleeve 32 and bearing 18 and maintains the desired bearing preload.

Figure 4:
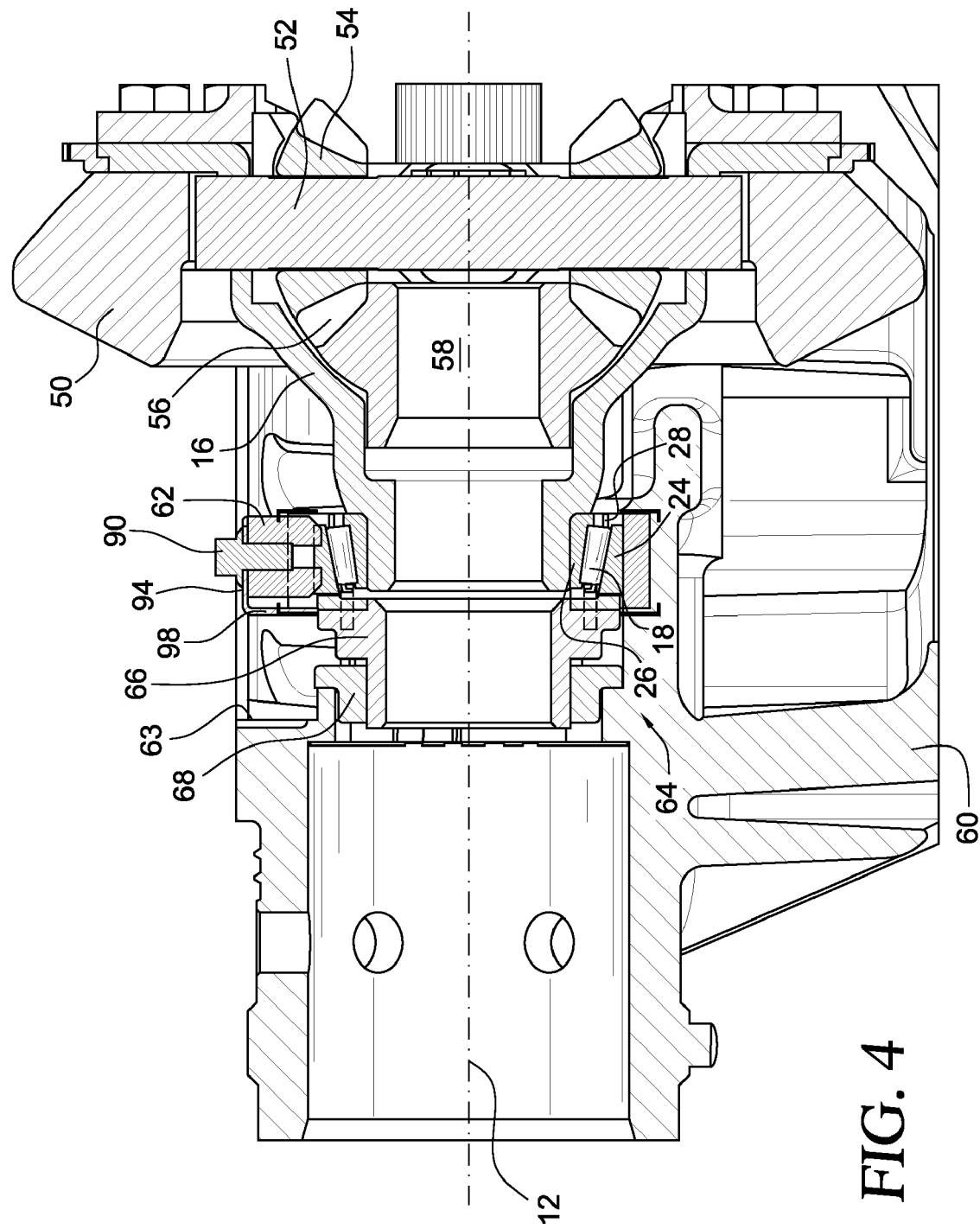
FIG. 4 is a partial side cross sectional view of a differential mechanism showing a bearing adjuster installed.

The assembly of FIG. 4 shows an alternate embodiment of the bearing adjuster. A ring gear 50, driven by a driveshaft, rotates about axis 12 and is secured to a spindle 52. The differential carrier and bevel pinions 54 rotate with spindle 52 about axis 12. A side bevel gear 56 is secured to an axle shaft 58, which extends laterally through a differential housing 60 and is driveably connected to a first wheel of a motor vehicle.

A semicircular bearing cap 62 is fitted into an opening 63 in housing 60 over the bearing 18. Bearing cap 62 is secured to housing 60 by the bolts 22, which engage internal screw threads formed in the housing.

The outer race 24 of bearing 18 contacts an inner surface of the bearing cap 62, and the inner race 26 contacts the differential carrier 16 and is seated against the shoulder 28 on the differential carrier.

Figure 7:
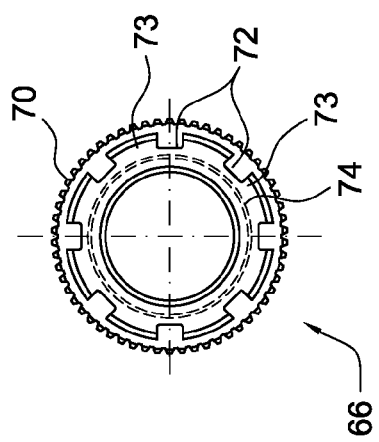
FIG. 7 is an end view of the inner bearing adjuster of FIG. 6.
Figure 6:
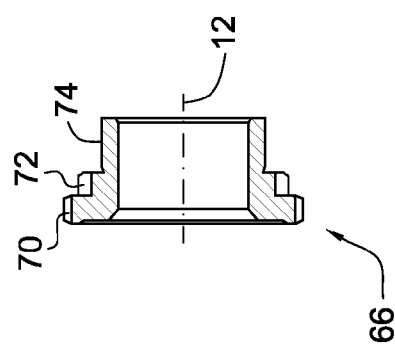
FIG. 6 is a side cross sectional view of an inner bearing adjuster.
Figure 5:
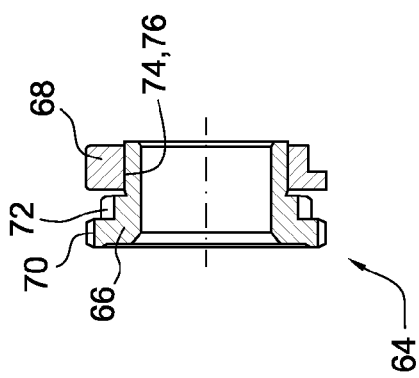
FIG. 5 is a side cross sectional view of a bearing adjuster assembly.

FIG. 5 illustrates an assembled bearing adjuster 64, which includes a bearing adjuster nut 66 and a bearing adjuster sleeve 68. FIGS. 6 and 7 show the bearing adjuster nut 66 is formed with external spur teeth 70 spaced about axis 12. The bearing adjuster nut 66 is also formed with a set of notches 72 spaced about axis 12. The bearing adjuster nut 66 further includes a hollow cylindrical surface concentric with axis 12 and formed with external screw threads 74. An additional internal drive feature may also be included in bearing adjuster nut 66.

Figure 8:
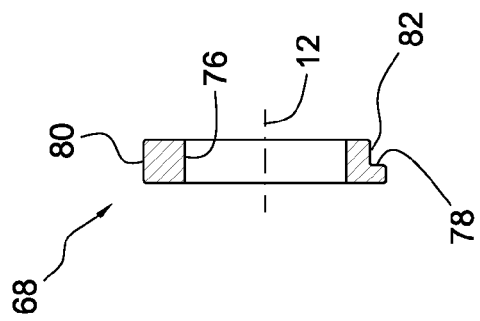
FIG. 8 is a side cross sectional view of an outer bearing adjuster.

As FIG. 8 illustrates, the bearing adjuster sleeve 68 is formed with internal screw threads 76, and a shoulder 78 located between a first outer cylindrical surface 80 and a second outer cylindrical surface 82, located radially inward from surface 80.

FIG. 9 shows the bearing cap 62 formed with holes 84, 86, which receive the bolts 22 that secure the bearing cap to the housing 60. Located between bolt holes 84, 86 is a threaded hole 88 that receives a threaded retention bolt 90.

FIG. 10 shows a locking tab 92 in the form of an angle having first leg 94 formed with a hole 96, through which the shank of bolt 90 passes, and a second leg 98 having a series of teeth 100 at its end for engaging multiple teeth 70 on the bearing adjuster nut 66.

As FIG. 4 illustrates, the bearing adjuster sleeve 68 is secured to housing 60 against rotation. Screw threads 74 formed on the exterior of the cylindrical surface of the bearing adjuster nut 66 engage screw threads 76 formed on the radially inner surface of the of the bearing adjuster sleeve 68.

Axial leg 94 of locking tab 92 is located under the head of bolt 90, such that hole 96 is aligned with the bolt. The recessed machined surface about hole 88 prevents rotation of the locking tab about the axis of retention bolt 90. Radial leg 98 is directed inward toward axis 12 such that its teeth 100 engage the teeth 70 on bearing adjuster nut 66, thereby preventing rotation of the bearing adjuster nut 66 relative to bearing 18.

In operation, the bearing adjuster nut 66 is assembled such that it engages the threads on bearing adjuster sleeve 68. Then bearing 18 and the bearing adjuster 64 are installed in the housing 60, such that the bearing adjuster sleeve 68 is keyed to and contacts a surface of the housing 60, thereby preventing rotation and axial displacement of the bearing adjuster sleeve 68 relative to the housing 60. Bearing cap 62 is fitted over bearing 18. Then the notches 72 of the bearing adjuster nut 66 are engaged through opening 63 by a tool, which applies torque to the bearing adjuster nut 66, thereby forcing it into contact with the outer race 24 of bearing 18. Alternately, an internal drive feature in bearing adjuster nut 66 can be used to apply this torque. The differential carrier 16 is then positioned, and the torque on adjuster nut 66, applied to either internal or exterior features, is increased to a predetermined reference torque or housing spread, at which the preload on bearing 18 is established within a desired range. Finally, the axial leg 94 of locking tab 92 is placed on the bearing cap 62, the shank of retention bolt 90 passes through hole 96 and is threaded into the hole 88 of the bearing cap, and the teeth 100 at the end of the radial leg engage the teeth 70 on the adjuster nut 66. This engagement prevents rotation of the bearing adjuster nut 66 relative to bearing 18, thereby maintaining the desired preload on the bearing 18.

FIG. 11 shows an adjuster arrangement similar to that shown in of FIG. 1. Housing 110 is formed with a local anti-rotation slot 112 located at angular position about axis 12. Slot 112 extends circumferentially a short distance and is bounded by angularly spaced surfaces of the housing 110. The adjuster sleeve 32 is formed with a local cylindrical boss 114 fitted in slot 112 to prevent rotation of sleeve 32 about axis 12 due to its contact with the surfaces of the slot 112 in housing 110. Therefore, as the adjuster nut 36 is driven in rotation about axis 12 and into engagement with bearing 18, the mutually engagement of the external screw threads 34 on sleeve 32 with the internal screw threads on adjuster nut 36 does not cause adjuster nut sleeve 32 to rotate.

FIG. 12 shows an adjuster nut 120 formed with an internal polygonal or drivable surface 122 that can be used to rotate adjuster nut 120 about axis 12. Surface 122 may be formed in each of the adjuster nuts 36, 66, 122.

In FIG. 12, the housing 110 is formed with the local anti-rotation slot 112, and adjuster sleeve 30 is formed with the local cylindrical boss 114, which is fitted into slot 112 to prevent rotation of sleeve 30 about axis 12, as described with reference to FIG. 11. The adjuster nut is formed with teeth or serrations 124 that are engaged by teeth 100 on the locking tab 92, which is installed after the adjuster nut 120 has correctly located carrier 16 in its proper position and preloaded bearing 18.

Figure 13:
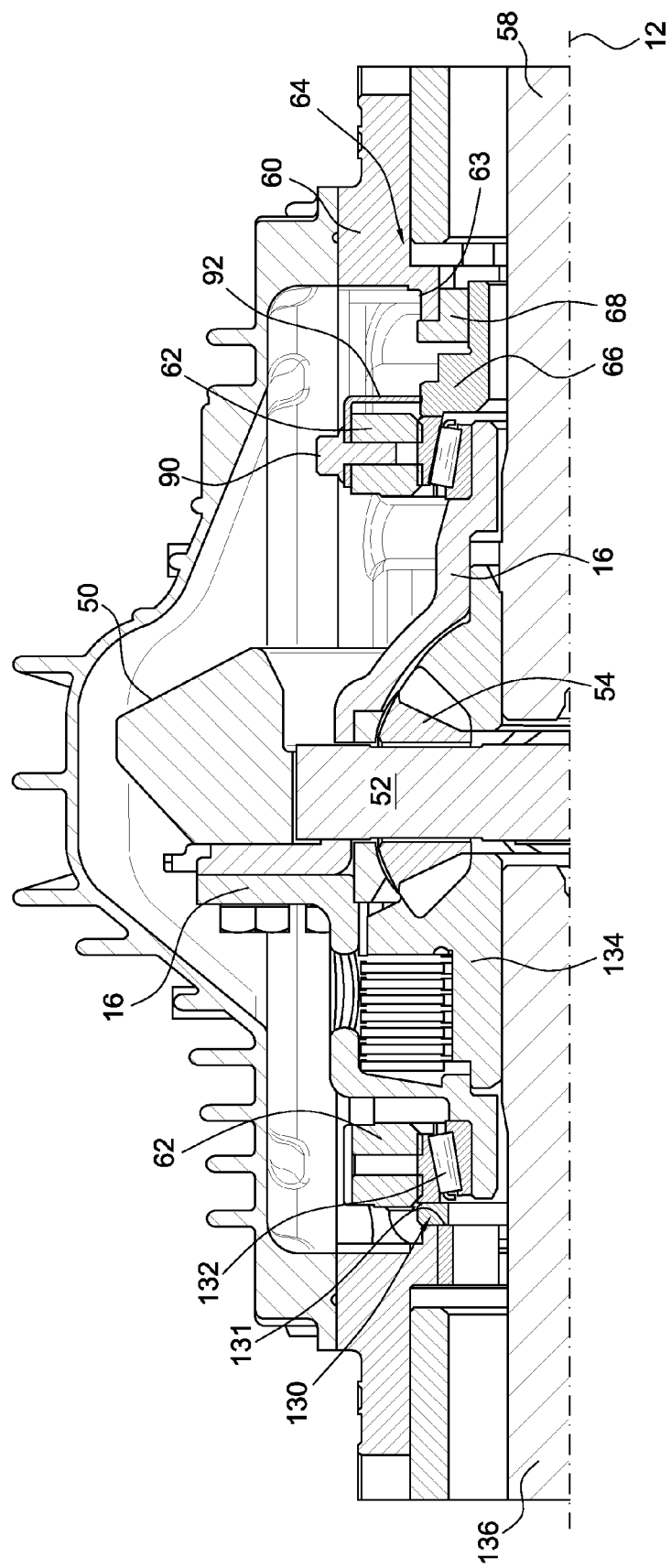
FIG. 13 is a partial side cross sectional view of a differential mechanism showing a bearing adjuster and a shim installed.

FIG. 13 shows an alternate embodiment of the bearing adjuster, similar to that shown in FIG. 4, but including a shim 130 located in a space between an abutment surface 131 of housing 60 and a tapered roller bearing 132. The thickness of shim 130 establishes the axial position of bearing 132 relative to the abutment surface 131 of housing 60, which is adjacent the shim. Bearing 132 is seated on carrier 16. The bevel pinions 54 engage a left-hand side bevel gear 134, secured to axle shaft 136, which extends laterally through the differential housing 60 and is driveably connected to a second wheel of the motor vehicle.

In operation, the bearing adjuster nut 66 is assembled such that it engages the threads on bearing adjuster sleeve 68. Then bearing 18 and the bearing adjuster 64 are installed in the housing 60, such that the bearing adjuster sleeve 68 is keyed to and contacts a surface of the housing 60, thereby preventing rotation and axial displacement of the bearing adjuster sleeve 68 relative to the housing 60. A bearing cap 62 is fitted over bearings 18 and 132. Then the notches 72 of the bearing adjuster nut 66 are engaged through opening 63 by a tool, which applies torque to the bearing adjuster nut 66, thereby forcing it into contact with the outer race 24 of bearing 18. Alternately, the internal drive surface 122 in bearing adjuster nut 66 can be used to apply this torque. The differential carrier 16 is then positioned, and the torque on adjuster nut 66, applied to either internal or exterior features, is increased to a predetermined reference torque or housing spread, at which the preload on bearings 18, 132 is established within a desired range. Finally, the axial leg 94 of locking tab 92 is placed on the bearing cap 62, the shank of retention bolt 90 passes through hole 96 and is threaded into the hole 88 of the bearing cap, and the teeth 100 at the end of the radial leg engage the teeth 70 on the adjuster nut 66. This engagement prevents rotation of the bearing adjuster nut 66 relative to bearing 18, thereby maintaining the desired preload on the bearings 18, 132.

In accordance with the provisions of the patent statutes, the preferred embodiment has been described. However, it should be noted that the alternate embodiments can be practiced otherwise than as specifically illustrated and described.

The invention claimed is:

1. An axle assembly comprising:
   a differential including a carrier, a bearing supporting the carrier, and a housing having a slot;
   an adjuster sleeve including a boss held against rotation and axial displacement by engagement with the slot;
   an adjuster nut threaded on the adjuster sleeve and producing a preload on the bearing;
   a locking device engaging and preventing rotation the adjuster nut relative to the bearing and maintaining the preload on the bearing.

2. The assembly of claim 1 wherein the rotation of the adjuster nut about an axis further causes the adjuster nut to establish a position of the carrier along the axis.

3. The assembly of claim 1 wherein the locking device is a locking pin secured against displacement and engaging the adjuster nut, said engagement preventing rotation of the adjuster nut relative to the bearing and maintaining the preload on the bearing.

4. The assembly of claim 1, further comprising:
   a bearing cap axially aligned with the bearing, located radially exterior of the bearing, and partially surrounding the bearing; and
   wherein the locking device is a locking pin secured to the bearing cap against displacement and engaging the adjuster nut, said engagement preventing rotation of the adjuster nut relative to the bearing and maintaining the preload on the bearing.

5. The assembly of claim 1 wherein the locking device is a locking tab secured against rotation about the axis and engaging the adjuster nut, said engagement preventing rotation of the adjuster nut relative to the bearing and maintaining the preload on the bearing.

6. The assembly of claim 1, further comprising:
   a bearing cap axially aligned with the bearing, located radially exterior of the bearing, and partially surrounding the bearing; and
   wherein the locking device is a locking tab secured to the bearing cap against rotation about the axis and engaging the adjuster nut, said engagement preventing rotation of the adjuster nut relative to the bearing and maintaining the preload on the bearing.

7. The assembly of claim 1, wherein the adjuster nut further comprises:
   screw threads that engage screw threads formed on the adjuster sleeve; and
   teeth angularly spaced mutually about an axis for rotating the adjuster nut about the axis.

8. The assembly of claim 1, wherein the adjuster nut further comprises:
   screw threads that engage screw threads formed on the adjuster sleeve; and
   a surface for engagement by a tool that rotates the adjuster nut about an axis.

9. The assembly of claim 1, further comprising:
   a bearing cap axially aligned with the bearing, located radially exterior of the bearing, and partially surrounding the bearing; and
   a locking tab that includes a first leg secured to the bearing cap, and a second leg extending radially from the first leg toward an axis, an end of the second leg engaging the adjuster nut and preventing rotation of the adjuster nut about the axis.

10. An axle assembly comprising:
    a housing formed with an abutment surface and a slot;
    a differential mechanism including a carrier located in the housing and including a first contact surface and a second contact surface;
    a first bearing and a second bearing, the first bearing supporting the carrier in rotation about an axis and engaged with the first contact surface, the second bearing supporting the carrier in rotation about an axis and engaged with the second contact surface;
    a shim located in a space between the abutment surface and the first bearing;
    an adjuster sleeve formed with first screw threads and a boss held against rotation and axial displacement by engagement with the slot;
    an adjuster nut formed with second screw threads that engage the first screw threads, such that rotation of the adjuster nut about the axis causes the adjuster nut to contact the second bearing and produce a preload force on the first bearing and the second bearing; and
    a locking device secured against displacement for engaging the adjuster nut, said engagement preventing rotation of the adjuster nut relative to the bearing and maintaining the preload on the bearings.

11. The assembly of claim 10 wherein the rotation of the adjuster nut about the axis further causes the adjuster nut to establish an axial position of the carrier.

12. The assembly of claim 10 wherein the locking device is a locking tab secured against rotation about the axis and engaging the adjuster nut, said engagement preventing rotation of the adjuster nut relative to one of the bearings and maintaining the preload on the bearings.

13. The assembly of claim 10, further comprising:
    a bearing cap axially aligned with the second bearing, located radially exterior of the second bearing, and partially surrounding the second bearing; and
    wherein the locking device is a locking tab secured to the bearing cap against rotation about the axis and engaging the adjuster nut, said engagement preventing rotation of the adjuster nut relative to the second bearing and maintaining the preload on the bearings.

14. The assembly of claim 10, wherein the adjuster nut further comprises:
    teeth angularly spaced mutually about the axis for rotating the adjuster nut about the axis.

15. The assembly of claim 10, wherein the adjuster nut further comprises:

an internal surface for engagement by a tool that rotates the adjuster nut about the axis.

16. A method for producing and maintaining a bearing preload in an axle assembly comprising:

installing a bearing in an axle housing such that displacement of the bearing is limited due to contact with the carrier and the bearing supports the carrier in rotation about an axis;

installing a bearing adjuster in the housing such that an adjuster sleeve is held against rotation and axial displacement, due to engaging a boss on the adjuster sleeve with a slot formed on the housing, and an adjuster nut engages the adjuster sleeve by screw threads;

rotating the adjuster nut about the axis causing the adjuster nut to contact the bearing and produce a preload force on the bearing between the adjuster nut and the carrier;

installing a locking device into engagement with the adjuster nut; and securing the locking device such that it prevents rotation of the adjuster nut relative to the bearing and maintains the preload on the bearing.

17. The method of claim 16, further comprising the step of:

positioning the carrier along the axis by rotating the adjuster nut about the axis.

* * * * *